(12) United States Patent
Gaynor et al.

(10) Patent No.: US 7,534,294 B1
(45) Date of Patent: May 19, 2009

(54) QUINACRIDONE NANOSCALE PIGMENT PARTICLES AND METHODS OF MAKING SAME

(75) Inventors: Roger E. Gaynor, Oakville (CA); C. Geoffrey Allen, Waterdown (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/102,363

(22) Filed: Apr. 14, 2008

(51) Int. Cl.
*C09B 48/00* (2006.01)
*B05D 7/00* (2006.01)

(52) U.S. Cl. .................. 106/497; 106/495; 427/212; 546/49; 546/56

(58) Field of Classification Search ................. 106/495, 106/497; 427/212; 546/49, 56
See application file for complete search history.

(56) References Cited

U.S. PATENT DOCUMENTS

| | | | |
|---|---|---|---|
| 2,821,529 | A | 1/1958 | Struve |
| 2,821,541 | A | 1/1958 | Struve |
| 3,201,402 | A | 8/1965 | Bohler et al. |
| 3,261,837 | A | 7/1966 | Bohler et al. |
| 4,830,671 | A | 5/1989 | Frihart et al. |
| 5,679,138 | A | 10/1997 | Bishop et al. |
| 6,537,364 | B2 | 3/2003 | Dietz et al. |
| 6,837,918 | B2 | 1/2005 | Pozarnsky et al. |
| 6,902,613 | B2 | 6/2005 | Babler et al. |
| 2005/0109240 | A1 | 5/2005 | Maeta et al. |
| 2006/0063873 | A1 | 3/2006 | Lin et al. |
| 2007/0012221 | A1 | 1/2007 | Maeta et al. |

FOREIGN PATENT DOCUMENTS

| | | |
|---|---|---|
| CH | 372316 | 11/1963 |
| CH | 404034 | 6/1966 |
| JP | 2005238342 A2 | 9/2005 |
| JP | 2007023168 | 2/2007 |
| JP | 2007023169 | 2/2007 |
| WO | 2004/026967 | 4/2004 |
| WO | 2004/048482 | 6/2004 |
| WO | 2006/005536 | 1/2006 |
| WO | 2006/011467 | 2/2006 |
| WO | 2006/024103 | 3/2006 |
| WO | 2006/132443 | 12/2006 |

OTHER PUBLICATIONS

U.S. Appl. No. 11/759,906, filed Jun. 7, 2007.
U.S. Appl. No. 11/759,913, filed Jun. 7, 2007.
K. Balakrishnan et al., "Effect of Side-Chain Substituents on Self-Assembly of Perylene Diimide Molecules: Morphology Control," *J. Am. Chem. Soc.*, vol. 128, p. 7390-98 (2006).
Kazuyuki Hayashi et al., "Uniformed nano-downsizing of organic pigments through core-shell structuring," Journal of Materials Chemistry, 17(6), 527-530 (2007).
W. Herbst, K. Hunger, *Industrial Organic Pigments*, "Quinacridone Pigments" Wiley-VCH Third Edition, p. 452-472 (2004).
B.R. Hsieh et al, "Organic Pigment Nanoparticle Thin Film Devices via Lewis Acid Pigment Solubilization and In Situ Pigment Dispersions," Journal of Imaging Science and Technology, vol. 45(1), p. 37-42 (2001).
F. Kehrer, "Neuere Entwicklung auf den Gebiet der Chemie organischer Pigmentfarbstoffe," Chimia, vol. 28(4), p. 173-183 (1974).
Hideki Maeta et al., "New Synthetic Method of Organic Pigment Nano Particle by Micro Reactor System," http://aiche.confex.com/aiche/s06/preliminaryprogram/abstract_40072.htm (date unknown).
Kento Ujiiye-Ishii et al., "Mass-Production of Pigment Nanocrystals by the Reprecipitation Method and their Encapsulation," *Molecular Crystals and Liquid Crystals*, v. 445 , p. 177 (2006).

*Primary Examiner*—Anthony J Green
(74) *Attorney, Agent, or Firm*—Oliff & Berridge, PLC

(57) ABSTRACT

A process for preparing coated nanoscale quinacridone pigment particles, includes providing a first solution containing a surface additive compound in an acid; adding a quinacridone pigment precursor or crude quinacridone pigment into the first solution and causing the surface additive compound to coat formed nanoscale quinacridone pigment particles; and adding the first solution and coated nanoscale quinacridone pigment particles into a second solution containing deionized water to form a third solution and to precipitate the coated nanoscale quinacridone pigment particles; wherein the surface additive compound is a rosin compound.

20 Claims, No Drawings

QUINACRIDONE NANOSCALE PIGMENT PARTICLES AND METHODS OF MAKING SAME

TECHNICAL FIELD

This disclosure is generally directed to nanoscale quinacridone pigment particles, particularly nanoscale quinacridone pigment particles comprising a quinacridone pigment and a surface additive, and methods for producing such nanoscale quinacridone pigment particles. Such particles are useful, for example, as nanoscopic colorants for such compositions as inks and the like, such as ink jet ink compositions, phase change ink compositions, and non-aqueous liquid ink compositions.

CROSS-REFERENCE TO RELATED APPLICATIONS

Disclosed in commonly assigned U.S. patent application Ser. No. 11/759,906 to Maria Birau et al. filed Jun. 7, 2007, is a nanoscale pigment particle composition, comprising: a quinacridone pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized particles. Also disclosed is a process for preparing nanoscale quinacridone pigment particles, comprising: preparing a first solution comprising: (a) a crude quinacridone pigment including at least one functional moiety and (b) a liquid medium; preparing a second solution comprising: (a) a sterically bulky stabilizer compound having one or more functional groups that associate non-covalently with the functional moiety, and (b) a liquid medium; combining the first solution into the second solution to form a third solution and effecting a reconstitution process which forms a quinacridone pigment composition wherein the functional moiety of the pigment associates non-covalently with the functional group of the stabilizer and having nanoscale particle size. Still further is disclosed a process for preparing nanoscale quinacridone pigment particles, comprising: preparing a first solution comprising a quinacridone pigment including at least one functional moiety in an acid; preparing a second solution comprising an organic medium and a sterically bulky stabilizer compound having one or more functional groups that associate non-covalently with the functional moiety of the pigment; treating the second solution containing with the first solution; and precipitating quinacridone pigment particles from the first solution, wherein the functional moiety associates non-covalently with the functional group and the quinacridone pigment particles have a nanoscale particle size.

Disclosed in commonly assigned U.S. patent application Ser. No. 11/759,913 to Rina Carlini et al. filed Jun. 7, 2007, is a nanoscale pigment particle composition, comprising: an organic monoazo laked pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized pigment particles. Also disclosed is a process for preparing nanoscale-sized monoazo laked pigment particles, comprising: preparing a first reaction mixture comprising: (a) a diazonium salt including at least one functional moiety as a first precursor to the laked pigment and (b) a liquid medium containing diazotizing agents generated in situ from nitrous acid derivatives; and preparing a second reaction mixture comprising: (a) a coupling agent including at least one functional moiety as a second precursor to the laked pigment and (b) a sterically bulky stabilizer compound having one or more functional groups that associate non-covalently wit the coupling agent; and (c) a liquid medium combining the first reaction mixture into the second reaction mixture to form a third solution and effecting a direct coupling reaction which forms a monoazo laked pigment composition wherein the functional moiety associates non-covalently with the functional group and having nanoscale particle size. Further disclosed is a process for preparing nanoscale monoazo laked pigment particles, comprising: providing a monoazo precursor dye to the monoazo laked pigment that includes at least one functional moiety; subjecting the monoazo precursor dye to an ion exchange reaction with a cation salt in the presence of a sterically bulky stabilizer compound having one or more functional groups; and precipitating the monoazo laked pigment as nanoscale particles, wherein the functional moiety of the pigment associates non-covalently with the functional group of the stabilizer and having nanoscale particle size.

The entire disclosure of the above-mentioned applications are totally incorporated herein by reference.

BACKGROUND

A printing ink is generally formulated according to strict performance requirements demanded by the intended market application and required properties. Whether formulated for office printing or for production printing, a particular ink is expected to produce images that are robust and durable under stress conditions. In a typical design of a piezoelectric ink jet printing device, the image is applied by jetting appropriately colored inks during four to six rotations (incremental movements) of a substrate (an image receiving member or intermediate transfer member) with respect to the ink jetting head, i.e., there is a small transaction of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Pigments are a class of colorants useful in a variety of applications such as for example paints, plastics and inks, including inkjet printing inks. Dyes have typically been the colorants of choice for inkjet printing inks because they are readily soluble colorants and, more importantly, do not hinder the reliable jetting of the ink. Dyes have also offered superior and brilliant color quality with an expansive color gamut for inks, when compared with conventional pigments. However, because dyes are molecularly dissolved in the ink vehicle, they are often susceptible to unwanted interactions that lead to poor ink performance, for example photooxidation from light (will lead to poor lightfastness), dye diffusion from the ink into paper or other substrates (will lead to poor image quality and showthrough), and the ability for the dye to leach into another solvent that makes contact with the image (will lead to poor water/solventfastness). In certain situations, pigments are the better alternative as colorants for inkjet printing inks since they are insoluble and cannot be molecularly dissolved within the ink matrix, and therefore do not experience colorant diffusion. Pigments can also be significantly less expensive than dyes, and so are attractive colorants for use in all printing inks.

Key issues with using pigments for inkjet inks are their large particle sizes and wide particle size distribution, the combination of which can pose critical problems with reliable jetting of the ink (i.e. inkjet nozzles are easily blocked). Pigments are rarely obtained in the form of single crystal particles, but rather as large aggregates of crystals and with wide distribution of aggregate sizes. The color characteristics of the pigment aggregate can vary widely depending on the aggregate size and crystal morphology. Thus, an ideal colorant that is widely applicable in, for example, inks and toners, is one that possesses the best properties of both dyes and pigments, namely: 1) superior coloristic properties (large color gamut, brilliance, hues, vivid color); 2) color stability and durability (thermal, light, chemical and air-stable colorants); 3) minimal or no colorant migration; 4) processable colorants (easy to disperse and stabilize in a matrix); and 5) inexpensive material cost. Thus, there is a need addressed by embodiments of the present invention, for smaller nanosized pigment particles that minimize or avoid the problems associated with conventional larger-sized pigment particles. There further remains a need for processes for making and using such improved nano-sized pigment particles as colorant materials. The present nanosized pigment particles are useful in, for example, paints, coatings and inks (e.g., inkjet printing inks) and other compositions where pigments can be used such as plastics, optoelectronic imaging components, photographic components, and cosmetics among others. The following documents provide background information:

U.S. Pat. No. 6,902,613 discloses a mixture of an organic nanosize pigment comprising of from 50 to 99% by weight of the nanosize pigment and 1 to 50% by weight based of a low molecular weight naphthalene sulfonic acid formaldehyde polymer and its use as a particle growth and crystal phase director for the preparation of a direct pigmentary organic pigment or in pigment finishing.

WO 2004/048482 discloses a mixture of an organic nanosize pigment comprising of from 50 to 99% by weight of the nanosize pigment and 1 to 50% by weight based of a low molecular weight polysulfonated hydrocarbon, in particular naphthalene mono- or disulfonic acid formaldehyde polymer, and its use as a particle growth and crystal phase director for the preparation of a direct pigmentary organic pigment or in pigment finishing.

U.S. patent application Publication No. 2006/0063873 discloses a process for preparing nano water paint comprising the steps of: A. modifying the chemical property on the surface of nano particles by hydroxylation for forming hydroxyl groups at high density on the surface of the nano particles; B. forming self-assembly monolayers of low surface energy compounds on the nano particles by substituting the self-assembly monolayers for the hydroxyl groups on the nano particles for disintegrating the clusters of nano particles and for forming the self-assembly monolayers homogeneously on the surface of the nano particles; and C. blending or mixing the nano particles having self-assembly monolayers formed thereon with organic paint to form nano water paint.

U.S. patent applicaton Publication No. 2005/0109240 describes a method of producing a fine particle of an organic pigment, containing the steps of: flowing a solution of an organic pigment dissolved in an alkaline or acidic aqueous medium, through a channel which provides a laminar flow; and changing a pH of the solution in the course of the laminar flow.

U.S. Pat. No. 3,201,402 discloses a process for the production of pigment dyestuffs of the quinacridone-7,14-dione series, which consists of reaction 1 more of 2,5-dihalogenoterephthalic acid and one or more of its esters either simultaneously or successively with 2 moles of an aromatic amine or of a mixture of different aromatic amines, in which at least one position ortho to the amino group is free, and coverting the resulting 2,5-diarylaminoterephthalic acid or its ester into a quinacridone-7,14-dione by heating at a high temperature in an acid condensation medium, if desired in presence of an inert organic solvent.

Kento Ujiiye-Ishii et al., "Mass-Production of Pigment Nanocrystals by the Reprecipitation Method and their Encapsulation," *Molecular Crystals and Liquid Crystals*, v. 445, p. 177 (2006) describes that quinacridone nanocrystals with controlled size and morphology were readily fabricated by using a pump as an injection apparatus of the reprecipitation method for mass-production and injecting concentrated N-methyl-2-pyrrolidinone solution. The reference describes that encapsulation of quinacridone nanocrystals using polymer was achieved and quite improved dispersibility was confirmed for the encapsulated nanocrystals.

Hideki Maeta et al., "New Synthetic Method of Organic Pigment Nano Particle by Micro Reactor System," in an abstract available on the internet, describes a new synthetic method of an organic pigment nano particle was realized by micro reactor. A flowing solution of an organic pigment, which dissolved in an alkaline aqueous organic solvent, mixed with a precipitation medium in a micro channel. Two types of micro reactor can be applied efficiently on this build-up procedure without blockage of the channel. The clear dispersion was extremely stable and had narrow size distribution, which were the features, difficult to realize by the conventional pulverizing method (breakdown procedure). These results proved the effectiveness of this process on micro reactor system.

WO 2006/132443 A1 describes a method of producing organic pigment fine particles by allowing two or more solutions, at least one of which is an organic pigment solution in which an organic pigment is dissolved, to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

K. Balakrishnan et al., "Effect of Side-Chain Substituents on Self-Assembly of Perylene Diimide Molecules: Morphology Control," *J. Am. Chem. Soc.*, vol. 128, p. 7390-98 (2006) describes the use of covalently-linked aliphatic side-chain substiutents that were functionalized onto perylene diimide molecules so as to modulate the self-assembly of molecules and generate distinct nanoparticle morphologies (nano-belts to nano-spheres), which in turn impacted the electronic properties of the material. The side-chain substituents studied were linear dodecyl chain, and a long branched nonyldecyl chain, the latter substituent leading to the more compact, spherical nanoparticle.

WO 2006/011467 discloses a pigment, which is used, for example, in color image display devices and can form a blue pixel capable of providing a high level of bright saturation, particularly a refined pigment, which has bright hue and is excellent in pigment properties such as lightfastness, solvent resistance and heat resistance, and a process for producing the same, a pigment dispersion using the pigment, and an ink for a color filter. The pigment is a subphthalocyanine pigment that is prepared by converting subphthalocyanine of the specified formula, to a pigment, has diffraction peaks at least at diffraction angles (2θ) 7.0°, 12.3°, 20.4° and 23.4° in X-ray diffraction and an average particle diameter of 120 to 20 nm.

WO 2006/005536 discloses a method for producing nanoparticles, in particular, pigment particles. Said method consists of the following steps: (i) a raw substance is passed into the gas phase, (ii) particles are produced by cooling or reacting the gaseous raw substance and (iii) an electrical charge is applied to the particles during the production of the particles in step (ii), in a device for producing nanoparticles. The disclosure further relates to a device for producing nanoparticles, comprising a supply line, which is used to transport the gas flow into the device, a particle producing and charging area in order to produce and charge nanoparticles at essentially the same time, and an evacuation line which is used to transport the charged nanoparticles from the particle producing and charging area.

Japanese Patent Application Publication No. JP 2005238342 A2 discloses irradiating ultrashort pulsed laser to organic bulk crystals dispersed in poor solvents to induce ablation by nonlinear absorption for crushing the crystals and recovering the resulting dispersions of scattered particles. The particles with average size approximately 10 nm are obtained without dispersants or grinding agents for contamination prevention and are suitable for pigments, pharmaceuticals, etc.

WO 2004026967 discloses nanoparticles manufactured by dissolving organic pigments in organic solvents containing at least 50 vol. % amides and adding the organic solvent solutions in solvents, which are poor solvents for the pigments and comparable with the organic solvents, while stirring. Thus, quinacridone pigment was dissolved in 1-methyl-2-pyrrolidinone and added to water with stirring to give a fine particle with average crystal size 20 nm.

U.S. Pat. No. 6,837,918 discloses a process and apparatus that collects pigment nanoparticles by forming a vapor of a pigment that is solid at room temperature, the vapor of the pigment being provided in an inert gaseous carrying medium. At least some of the pigment is solidified within the gaseous stream. The gaseous stream and pigment material is moved in a gaseous carrying environment into or through a dry mechanical pumping system. While the particles are within the dry mechanical pumping system or after the nanoparticles have moved through the dry pumping system, the pigment material and nanoparticles are contacted with an inert liquid collecting medium.

U.S. Pat. No. 6,537,364 discloses a process for the fine division of pigments which comprises dissolving coarsely crystalline crude pigments in a solvent and precipitating them with a liquid precipitation medium by spraying the pigment solution and the precipitation medium through nozzles to a point of conjoint collision in a reactor chamber enclosed by a housing in a microjet reactor, a gas or an evaporating liquid being passed into the reactor chamber through an opening in the housing for the purpose of maintaining a gas atmosphere in the reactor chamber, and the resulting pigment suspension and the gas or the evaporated liquid being removed from the reactor through a further opening in the housing by means of overpressure on the gas entry side or underpressure on the product and gas exit side.

U.S. Pat. No. 5,679,138 discloses a process for making ink jet inks, comprising the steps of: (A) providing an organic pigment dispersion containing a pigment, a carrier for the pigment and a dispersant; (B) mixing the pigment dispersion with rigid milling media having an average particle size less than 100 μm; (C) introducing the mixture of step (B) into a high speed mill; (D) milling the mixture from step (C) until a pigment particle size distribution is obtained wherein 90% by weight of the pigment particles have a size less than 100 nanometers (nm); (E) separating the milling media from the mixture milled in step (D); and (F) diluting the mixture from step (E) to obtain an ink jet link having a pigment concentration suitable for ink jet printers.

Japanese Patent Application Publications Nos. JP 2007023168 and JP 2007023169 discloses providing a pigment dispersion compound excellent in dispersibility and flowability used for the color filter which has high contrast and weatherability. The solution of the organic material, for example, the organic pigment, dissolved in a good solvent under the existence of alkali soluble binder (A) which has an acidic group, and a poor solvent which makes the phase change to the solvent are mixed. The pigment nanoparticles dispersed compound re-decentralized in the organic solvent containing the alkali soluble binder (B) which concentrates the organic pigment nanoparticles which formed the organic pigment as the particles of particle size less than 1 μm, and further has the acidic group.

Kazuyuki Hayashi et al., "Uniformed nano-downsizing of organic pigments through core-shell structuring," Journal of Materials Chemistry, 17(6), 527-530 (2007) discloses that mechanical dry milling of organic pigments in the presence of mono-dispersed silica nanoparticles gave core-shell hybrid pigments with uniform size and shape reflecting those of the inorganic particles, in striking contrast to conventional milling as a breakdown process, which results in limited size reduction and wide size distribution.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

Other publications of interest, and other aspects of which may be selected for embodiments of the present disclosure, include:

1) Herbst, K. Hunger, *Industrial Organic Pigments*, "Quinacridone Pigments" Wiley-VCH Third Edition, p. 452-472 (2004);

2) F. Kehrer, "Neuere Entwicklung auf den Gebiet der Chemie organischer Pigmentfarbstoffe," Chimia, vol. 28(4), p. 173-183 (1974);

3) B. R. Hsieh et al, "Organic Pigment Nanoparticle Thin Film Devices via Lewis Acid Pigment Solublization and In Situ Pigment Dispersions," Journal of Imaging Science and Technology, vol. 45(1), p. 37-42 (2001);

4) Swiss Patent No. 372316 to H. Bohler et al, Nov. 30, 1963; and

5) Swiss Patent No. 404034 to H. Bohler, Jun. 30, 1966

The appropriate components and process aspects of each of the foregoing may be selected for the present disclosure in embodiments thereof, and the entire disclosure of the above-mentioned references are totally incorporated herein by reference.

SUMMARY

The present disclosure addresses these and other needs, by providing nanoscale quinacridone pigment particles and methods for producing such nanoscale quinacridone pigment particles.

Although various processes for making quinacridone pigment particles are known, most commercial pigments have large particle size and wide size distributions, which can cause problems with reliable jetting of the ink. An economical procedure to overcome this is usually via salt milling of the pigment to a smaller more uniform size. However, a need still exists for processes to make nanoscale quinacridone pigment particles, in an economical and scalable manner, where the nanoscale quinacridone pigment particles can be readily dispersed as in ink vehicle.

The present disclosure provides a process to make nanoparticles of quinacridone pigments, such as Pigment Red 122, and incorporates a class of additive to the surface of the nanopigment to enable dispersibility into an ink vehicle and maintain stability of the ink dispersion. The quinacridone nanoparticles can be prepared by dissolution of the additive and the pigment together in hot acid, such as sulfuric acid, followed by reprecipitation under high agitation in a cold aqueous medium. This process eliminates the use of expensive solvents. The process in readily scalable and cost effective, and can be easily incorporated into a commercial manufacturing facility.

In an embodiment, the disclosure provides a process for preparing coated nanoscale quinacridone pigment particles, comprising:
  providing a first solution comprising a surface additive compound in an acid;
  adding a quinacridone pigment precursor or crude quinacridone pigment into the first solution and causing said surface additive compound to coat formed nanoscale quinacridone pigment particles; and
  adding the first solution and coated nanoscale quinacridone pigment particles into a second solution comprising deionized water to form a third solution and to precipitate the coated nanoscale quinacridone pigment particles;
  wherein the surface additive compound comprises a rosin compound.

DETAILED DESCRIPTION OF EXEMPLARY EMBODIMENTS

Embodiments of the present disclosure provide nanoscale quinacridone pigment particles, and methods for producing such nanoscale quinacridone pigment particles. The nanoscale quinacridone pigment particles include a rosin compound as a surface additive, which not only helps to provide the nanoscale sized particles, but also improves dispersibility and stability of the nanoscale quinacridone pigment particles in ink vehicles. In embodiments, the nanoscale quinacridone pigment particles can be prepared by a method comprising adding the surface additive to the concentrated acid used for the pigment dissolution, followed by addition of the pigment. The combined pigment and additive are heated and dissolved together to get a homogeneous coating of the surface additive on the pigment surface. The pigment/additive combination is quenched together in a cold medium such as de-ionized water under vigorous agitation, to obtain a dispersed nanoparticle pigment slurry. This dispersed nanopigment slurry can be neutralized with ammonia solution to reduce the required amount of de-ionized water washes needed to subsequently purify the isolated pigment. The wet pigment cake can then be washed, for example with acetonitrile, to remove water to aide drying. The pigment can also be left as a wet cake and dispersed directly in an ink formulation.

The term "precursor" or "pigment precursor" as used in "precursor to the organic pigment" can be any chemical substance that is an advanced intermediate in the total synthesis of a compound (such as the organic pigment). In embodiments, the organic pigment and the pigment precursor may or may not have the same functional moiety. In embodiments, the pigment precursor to the organic pigment may or may not be a colored compound. In still other embodiments, the pigment precursor and the organic pigment can have different functional moieties.

Representative pigment precursors include the 2,5-dianilino-terephthalic and their corresponding ester derivatives with any hydrocarbon chain R, as indicated in Formula 1 below. The hydrocarbon chain R can represent (but is not limited to) hydrogen, a straight or branched alkyl group with 1 to about 20 carbons such as methyl, ethyl, propyl, isopropyl, butyl and the like, or cyclic alkyl groups such as cyclohexyl, or any substituted or unsubstituted aryl group such as phenyl, naphthyl, para-methoxybenzyl, and others. The functional moieties $R_1$ and $R_2$ can be present at any position on the aniline aromatic ring such as ortho, meta or para; they can be different or identical with each other and include the following functional groups: H, alkyl group with 1 to about 20 carbons such as methyl, ethyl, alkoxyl group with 1 to about 20 carbons such as methoxyl, ethoxyl, aryloxyl such as phenoxyl, and arylalkoxyl such as benzyloxyl and any halide such as Cl, Br

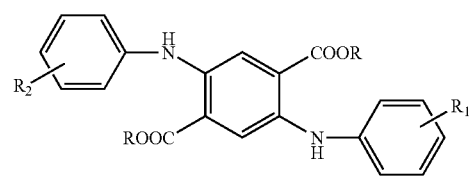

Formula 1. Quinacridone Pigment Precursors

In specific embodiments, compounds of formula 1 include the following:
  —R=H or any hydrocarbon chain, $R_1$=$R_2$=H;
  —R=H or any hydrocarbon chain, $R_1$=H, $R_2$=halide such as Cl or Br;
  —R=H or any hydrocarbon chain, $R_1$=$R_2$=$CH_3$, $CH_2CH_3$, $CH_2CH_2CH_3$, $CH(CH_3)_2$;
  —R=H or any hydrocarbon chain, $R_1$=H, $R_2$=$CH_3$, $CH_2CH_3$, $CH_2CH_2CH_3$, $CH(CH_3)_2$;
  —R=H or any hydrocarbon chain, $R_1$=$CH_3$, $CH_2CH_3$, $CH_2CH_2CH_3$, $CH(CH_3)_2$, $R_2$=halide such as Cl or Br;
  —R=H or any hydrocarbon chain, $R_1$=$R_2$=halide such as Cl or Br;
  —R=H or any hydrocarbon chain, $R_1$=Cl, $R_2$=Br;
  —R=H or any hydrocarbon chain, $R_1$=$R_2$=O—$CH_3$, O—$CH_2CH_3$, O—$CH_2CH_2CH_3$, O—$CH(CH_3)_2$, O—$(CH_2)C_6H_5$;

—R=H or any hydrocarbon chain, $R_1$=H, $R_2$=OCH$_3$, O—CH$_2$CH$_3$, O—CH$_2$CH$_2$CH$_3$, O—CH(CH$_3$)$_2$, O—(CH$_2$)C$_6$H$_5$; and —R=H or any hydrocarbon chain, $R_1$=OCH$_3$, O—CH$_2$CH$_3$, O—CH$_2$CH$_2$CH$_3$, O—CH(CH$_3$)$_2$, O—(CH$_2$)C$_6$H$_5$, $R_2$=halide such as Cl or Br.

Representative surface additive compounds include any rosin compound, such as rosin, rosin esters, rosin acids, rosin salts, or the like, that have the function of coating the pigment particles to limit the extent of pigment particle or molecular self-assembly so as to produce predominantly nanoscale-sized pigment particles. The rosin compounds can be hydrogenated or not, and thus can include hydrogenated rosin, hydrogenated rosin esters, hydrogenated rosin acids, hydrogenated rosin salts, or the like. Specific examples of such rosin compounds include, for example, hydrogenated rosin esters (such as Pinecrystal KE-100 or KE-311 manufactured by Arakawa Kagaku Co., Ltd.), hydrogenated rosin glycerin ester, levopimaric acid, neoabietic acid, palustric acid, abietic acid, dehydroabietic acid, seco-dehydroabietic acid, tetrahydroabietic acid, dihydroabietic acid, pimaric acid, and isopimaric acid, calcium resonates, zinc resonates, magnesium resonates, barium resonates, lead resonates, cobalt resonates, mixed resonates (such as calcium and zinc resonates), sodium salts of rosins (such as DRESINATE X™ from Hercules Paper Technology Group), alkyl esters of rosin or hydrogenated rosin (such as HERCOLYN D™, a methylester of hydrogenated rosin from Hercules, Inc., and ABALYN™, a methylester of rosin from Hercules, Inc.), mixtures thereof, and the like. For example, one specific commercial example of a suitable surface additive compound is KE-100, a hydrogenated rosin ester available from Arakawa Chemical Industries.

The surface additive coats the pigment particles to inactivate any surface functional moieties of the pigment particle, and to limit pigment particle growth. The surface coating can, in embodiments, the complete such that a continuous or substantially continuous coating is provided on the pigment particles. However, in other embodiments, the coating can be of only a part of the pigment particles, to provide a discontinuous coating. In either case, the coating enables not only pigment particle growth control, but also provides surface properties that enable dispersion of the formed particles into vehicles such as ink vehicles with improved dispersion and stability.

The "average" particle size, typically represented as $D_{50}$, is defined as the median particle size value at the 50th percentile of the particle size distribution, wherein 50% of the particles in the distribution are greater than the $D_{50}$ particle size value and the other 50% of the particles in the distribution are less than the $D_{50}$ value. Average particle size can be measured by methods that use light scattering technology to infer particle size, such as Dynamic Light Scattering. The term "particle diameter" as used herein refers to the length of the coated pigment particle as derived from images of the particles generated by Transmission Electron Microscopy. The term "nanosized" (or "nanoscale" or "nanoscale sized") such as used in "nanosized pigment particles" refers to, for instance, an average particle size $D_{50}$, of less than about 150 nm, such as about 1 nm to about 100 nm, or about 10 nm to about 80 nm. Geometric standard deviation is a dimensionless number that typically estimates a population's dispersion of a given attribute (for instance, particle size) about the median value of the population and is derived from the exponentiated value of the standard deviation of the log-transformed values. If the geometric mean (or median) of a set of numbers {$A_1$, $A_2$, ..., $A_n$} is denoted as $\mu_g$, then the geometric standard deviation is calculated as:

$$\sigma_g = \exp\sqrt{\frac{\sum_{i=1}^{n}(\ln A_i - \ln \mu_g)^2}{n}}$$

Commercial pigments, having typical median particle sizes of at least about 100 nm to about 1 micron, have both varied particle size distributions and particle aspect ratios. The aspect ratio of a particle relates its length dimension to its width dimension. Generally, the aspect ratio of a particle increases with its length dimension and, frequently, produces acicular and/or irregular morphologies that can include ellipsoids, rods, platelets, needles, and the like. Typically, organic pigments such as for example quinacridone pigments, have large particle size distribution as well as large distribution of particle aspect ratios and potentially, a large distribution of particle morphologies. This scenario is undesirable, as it can lead to non-dispersed, phase-segregated inks or dispersions and the like made from such pigments having a large distribution of particle size and/or aspect ratio.

Quinacridone nanopigments, when properly synthesized using exemplary conditions and surface additives outlined herein in embodiments, will have a more regular distribution of particle sizes and particle aspect ratio (length:width), the latter being about less than 4:1 with the median particle size being less than about 100 nm, as determined using a dynamic light scattering technique such as with a particle size analyzer.

An advantage of the processes and compositions of the disclosure is that they provide the ability to tune particle size and composition for the intended end use application of the quinacridone pigment. This leads to an overall higher color purity of the pigment particles when they are dispersed onto various media for being coated, sprayed, jetted, extruded, etc.

There are several known methods for the total synthesis of quinacridone pigments, which consist of chemical transformations to form the pentacyclic ring system by either the thermally-induced ring closure or the acid-catalyzed ring closure as described by W. Herbst and K. Hunger in *Industrial Organic Pigments*, chapter "Quinacridone Pigments" Wiley-VCH Third Edition, p. 452-472 (2004). The pentacyclic ring system of quinacridone can be approached by the latter acid-catalyzed ring closure reaction on a 2,5-dianilino terephthalic acid or ester pigment precursor, as illustrated in Formula (1) above and the following reaction schemes, which in turn is prepared from one of two known starting materials: a) succinate esters, and b) 2,5-dihalo-terephthalic acid.

Scheme (1)
Acidic Catalyzed Ring Closure Process Starting from Succinate Esters

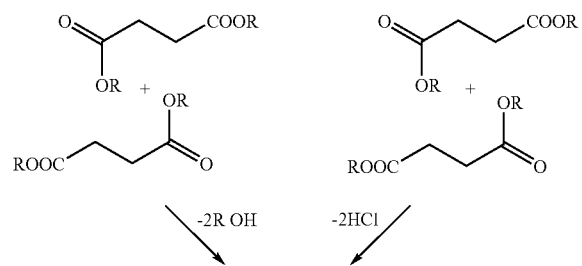

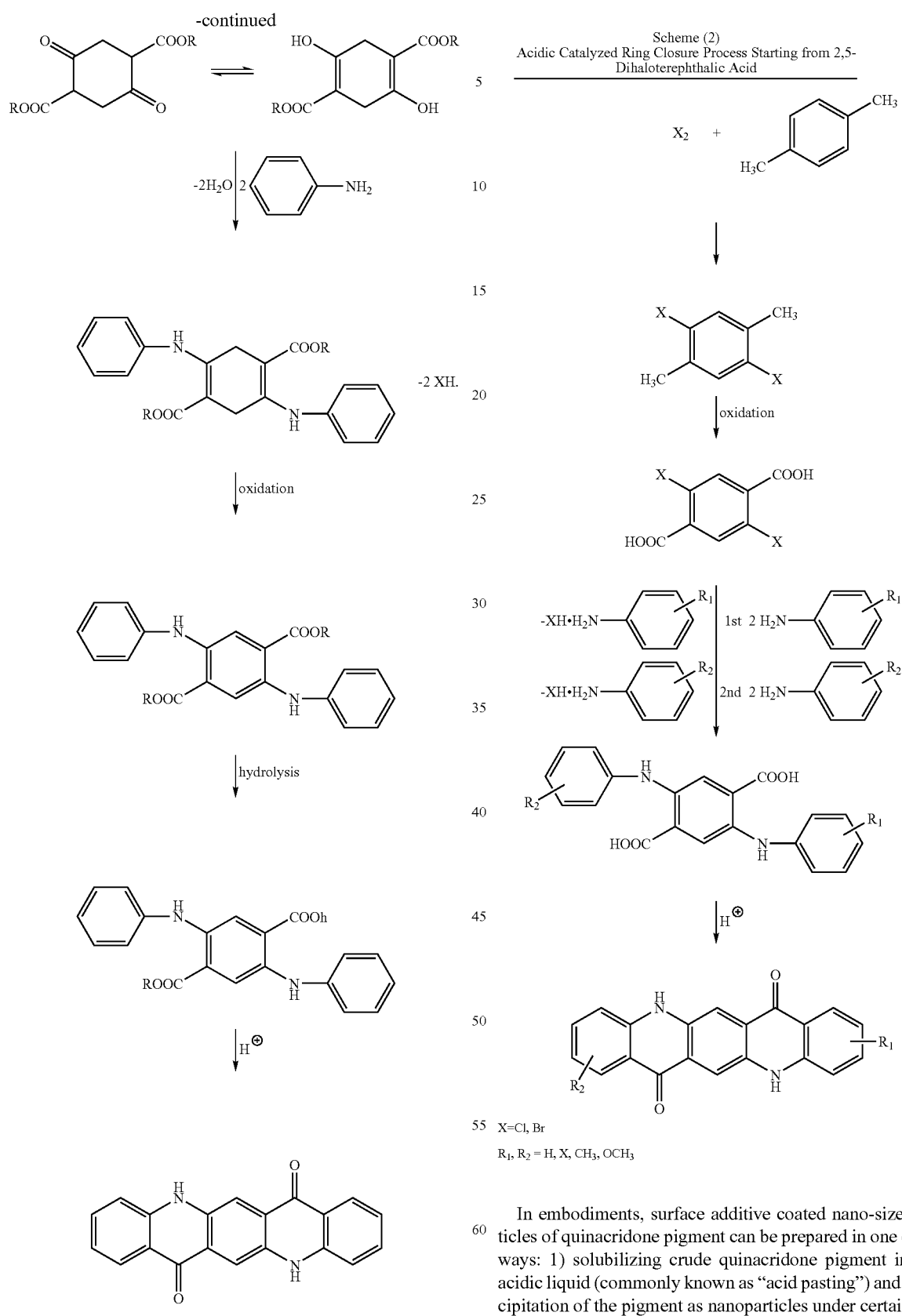

In embodiments, surface additive coated nano-sized particles of quinacridone pigment can be prepared in one of two ways: 1) solubilizing crude quinacridone pigment into an acidic liquid (commonly known as "acid pasting") and reprecipitation of the pigment as nanoparticles under certain conditions; and 2) synthesis of nano-sized particles of quinacridone pigment by acid-catalyzed ring closure of an advanced pigment precursor.

In embodiments, the surface additive is added to the acid medium before the pigment or pigment precursor materials. Thus, the surface additive is solubilized or dispersed in the acid medium, such as by stirring or the like. The acid medium can be heated to or maintained at a desired temperature, such as from about 0° C. to about 100° C., such as about 20° C. to about 80° C. or about 40° C. to about 60° C. However, in embodiments, the acid medium is heated to a temperature above room temperature, as a higher temperature assists in the dissolution of the surface additive as well as the subsequent dissolution of the pigment materials.

In these methods, a first solution is prepared or provided that comprises the surface additive dissolved or dispersed in a strong acid. The strong acid can be, for example, a mineral acid, an organic acid, or a mixture thereof. Examples of strong mineral acids include sulfuric acid, nitric acid, perchloric acid, various hydrohalic acids (such as hydrochloric acid, hydrobromic acid, and hydrofluoric acid), fluorsulfonic acid, chlorosulfonic acid, phosphoric acid, polyphosphoric acid, boric acid, mixtures thereof, and the like. Examples of strong organic acids include organic sulfonic acid, such as methanesulfonic acid and toluenesulfonic acid, acetic acid, trifluoroacetic acid, chloroacetic acid, cyanoacetic acid, mixtures thereof, and the like This first solution can include the strong acid in any desirable amount or concentration, such as to allow for desired dissolution or dispersion of the surface additive and the subsequent dissolution or dispersion of the pigment particles. The amount of acid solution can be selected such that after pigment addition, the acid solution contains pigment in a concentration of 0.5% to 20%, such as 1% to 15% or 2% to 10% by weight, although the values can also be outside these ranges.

In the method 1), the crude quinacridone pigment is added to the strong acid solution of surface additive. The addition is generally conducted slowly, such as dropwise, with vigorous agitation, although the addition can be conducted in various other ways. The addition can also be conducted with a minor amount of a surface-active agent or other common additive, if desired. During the addition, the temperature is maintained anywhere in the above temperature ranges, although the re-precipitation of quinacridone pigment to form nanoparticles can be held isothermally within or outside this temperature range, in one embodiment and, in another embodiment, the temperature during re-precipitation of quinacridone pigment to form nanoparticles can also be allowed to cycle up and down within or outside this temperature range.

Once the pigment material is added to the first solution, the first solution can be held and stirred for an amount of time to allow suitable and desired coating of the pigment particles by the surface additive. This process can be allowed to take place, for example, for a period of time of about 10 minutes to about 10 hours, such as about 1 to about 5 hours or about 2 to about 4 hours, as desired.

Any suitable liquid medium can be used to carry out the re-precipitation of the quinacridone pigment so as to afford surface additive coated nano-sized particles. Desirably, the re-precipitation can be carried out in deionized water, which avoids the use of costly organic solvents and the additional washing and separation steps needed in the pigment particle recovery. The second solution, in which the re-precipitation is carried out, thus desirably includes deionized water as the major component.

If desired, a precipitating agent can also be incorporated into the second solution. Any liquid that will not dissolve the coated pigment can be used as an optional precipitating agent. Suitable precipitating agents include, but are not limited to, alcohols such as methanol, ethanol, 1-propanol, 2-propanol, 1-butanol, 2-butanol; water, tetrahydrofuran, ethyl acetate, hydrocarbon solvents such as hexanes, toluene, xylenes, Isopar solvents, and mixtures thereof. The optional precipitating agent can also be ammonia solution (concentrated solution or other percentages). The precipitating agent can be added in a range of about 10% to about 100% by volume of the total volume of the mixture, such as between about 20% and about 80%, or between about 30% and about 70%.

The re-precipitation of the pigment to form nano-sized particles can be conducted by adding the first solution of dissolved pigment and surface additive to the second (re-precipitation) solution. In embodiments, this addition is conducted slowly by adding the first solution to the second solution under vigorous agitation such as by use of high-speed mechanical stirring or homogenization or other means.

In this method 1), the re-precipitation process can be conducted at any desired temperature to allow for formation of coated quinacridone nanoparticles while maintaining solubility of the first and second solutions. For example, the re-precipitation can be conducted at a temperature of from about 0° to about 90° C., such as from about 0° to about 40° C., or from about 0° to about 20° C., although temperatures outside of these ranges can be used, if desired. In one embodiment, the re-precipitation can be performed essentially isothermally, where a substantially constant temperature is maintained, while in another embodiment, the temperature during re-precipitation can be allowed to fluctuate within a desired range, where the fluctuation can be cyclic or the like.

Once the re-precipitation is complete, the quenched mixture can be neutralized (to neutralize the acid) by adding a suitable base to the solution. For example, the solution can be neutralized by the dropwise addition of aqueous ammonia solution. Other suitable neutralizing agents can include alkali metal hydroxides and carbonates, such as NaOH, KOH, $Na_2CO_3$, $K_2CO_3$, and the like.

Once the neutralization is complete, the pigment nanoparticles can be separated from the solution by any conventional means, such as for example, vacuum-filtration methods or centrifugal separation methods. The nanoparticles can also be processed for subsequent use according to known methods.

Due to the nature of the small size of the nanoparticles that are formed from this process, the pigment can form a foam in solution, which is very difficult to filter. To help overcome the foam and aide the filter/pigment isolation procedure, a de-foaming agent can added to the neutralized solution. Any suitable d-foaming agent can be used, and an example includes 2-ethylhexyl alcohol, which can be used in an amount of about 2 to about 20 weight percent of the pigment loading. Other de-foaming agents can also be used.

A second method of making surface additive coated nano-sized particles of quinacridone pigment involves acid-catalyzed ring closure of a quinacridone pigment precursor. In this second method 2), the pigment is synthesized concurrently with nanoparticle formation. That is, pigment molecules are prepared from precursor compounds according to known chemical synthesis processes, except that within a key step that involved acid-catalyzed ring closure to form the quinacridone pentacyclic ring system, the above-described surface additive compound is introduced, to coat the formed nanopigment particles.

Various processes for synthesizing quinacridone pigments are well known in the art. For example, U.S. Pat. Nos. 2,821,529 and 2,821,541 each describe a six-step process for making quinacridone pigments by constructing the middle aromatic ring first. A newer approach, described by Von F. Kehrer, *Chimia*, vol. 26, p. 173 (1974), is a three-step process beginning from an aromatic starting material. The entire disclosures of these references are incorporated herein by reference. For example, various pigment precursors of formula (1) above can be produced from aromatic starting materials, and then subsequently these pigment precursors are subjected to an acid-catalyzed ring closure reaction. If this reaction is performed in the presence of the described surface additives, the desired coated quinacridone pigment nanoparticles are formed.

For example, one embodiment of the second method discloses the synthesis of quinacridone pigment nanoparticles starting from a halogenated aromatic raw material, as outlined in scheme (1) above. A key intermediate is the pigment precursor, 2,5-dianilino terephthalic acid or its diester derivative, as illustrated in Formula (1). An acid-catalyzed cyclization is performed on this pigment precursor in the presence of the surface additive compound. In this particular method, the acid-catalyzed cyclization can be conducted in any suitable acidic liquid medium, such as, for example, in the presence of any of the strong acids as described previously for the first method of making quinacridone pigment nanoparticles. Representative examples include, but are not limited to, sulfuric acid, nitric acid, mono-, di-, and tri-halo acetic acids such as trifluoroacetic acid, dichloroacetic acid and the like, halogen acids such as hydrochloric acid, phosphoric acid and polyphosphoric acid, boric acid, and a variety of mixtures thereof. As in the first method above, the first solution in which the acid-catalyzed cyclization occurs already has the surface additive solublizied or dispersed therein.

During the acid-catalyzed cyclization reaction, the presence of the added surface additive coats the nanoparticles as they are formed, to thereby control and limit particle growth. In this way, the pigment particle size and morphology can be controlled and even tailored by providing surface additive compositions and process conditions that limit pigment particle growth to a desired level.

The re-precipitation and neutralization in the second method can be conducted in the same manner as in the first method. Once the re-precipitation and neutralization is complete, the coated pigment nanoparticles can be separated from the solution by any conventional means, such as for example, vacuum-filtration methods or centrifugal separation methods. The nanoparticles can also be processed for subsequent use according to known methods.

Each of the methods allows for narrow control of the pigment particle size and morphology, and particle size and morphology distribution. For example, these methods allow for controlling the pigment particle size to be of nanoscale size, having an average particle size of less than about 150 nm, such as ranging from about 10 nm to about 100 nm, or about 10 nm to about 80 nm, and with a narrow particle size distribution (GSD), such as about 1.1 to about 1.8, such as about 1.2 to about 1.7, or about 1.3 to about 1.5. Likewise, the formed nanopigments can have a narrow aspect ratio range of, for example, less than about 4:1 (length:width).

The formed nanoscale quinacridone pigment particles can be used, for example, as colorants in a variety of compositions, such as in liquid (aqueous or non-aqueous) ink vehicles, including inks used in conventional pens, markers, and the like, liquid ink jet ink compositions, solid or phase change ink compositions, and the like. For example, the colored nanoparticles can be formulated into a variety of ink vehicles, including solid inks with melt temperatures of about 60 to about 140° C., solvent-based liquid inks or radiation UV-curable liquid inks comprised of alkyloxylated monomers, and even aqueous inks.

The invention will now be described in detail with respect to specific exemplary embodiments thereof, it being understood that these examples are intended to be illustrative only and the invention is not intended to be limited to the materials, conditions, or process parameters recited herein. All percentages and parts are by weight unless otherwise indicated.

EXAMPLES

Example 1

In a 2 L jacketed reactor vessel fitted with a mechanical agitator (Heidolph mixer), condenser, and temperature probe, 750 g of concentrated (96-98%) sulfuric acid. The agitator is started and set to 300 rpm. 1.5 g (3 wt %) of KE-100 Pine Crystal (from Arakawa Chemical Industries) is added to the acid. 50 g of PR122 (from Dainichiseika) is added to the stirred acid mixture over a period of 30 minutes. A nitrogen atmosphere is introduced into the reactor and the mixture is heated to 50° C. in 30 minutes, using a ciruclatory bath attached to the reactor jacket, and kept at 50° C. for 3 hours to fully dissolve the pigment.

In a 6 L jacketed reactor vessel fitted with a mechanical agitator (IKA mixer) with a P4 stirrer blade, condenser with nitrogen fitting and temperature probe is charged 1200 g de-ionized water. The reactor agitator is started and adjusted to 420 rpm. Cooling is applied to the 6 L reactor with a circulatory bath to bring the de-ionized water temperature to 5° C. After the 3 hour pigment dissolution time in the 2 L reactor, the pigment solution is added to the chilled and stirred de-ionized water dropwise over a period of 90 minutes, to quench the acid and precipitate the pigment. The reaction mixture is maintained at 5-10° C. during the quenching step via cooling applied to the reactor jacket via the circulatory bath. The quenched mixture is neutralized by the dropwise addition of 1000 g of 26-30% aqueous ammonia solution over a period of 90 minutes. The reaction mixture is maintained at 5-15° C. during the neutralization step via cooling applied to the reactor jacket via the circulatory bath. The pigment is filtered and concentrated using a Crossflow filtration unit fitted with a 0.5 micron ceramic filter element. The concentrated pigment slurry undergoes repeated washing/concentration with fresh de-ionized water, using the Crossflow unit, until the filtrate pH is 8. The concentrated pigment slurry is then vacuum filtered in a Nutche type filter (fitted with a 0.5 µ Gortex filter media) to isolate a wet pigment cake. The wet pigment cake is then re-slurry washed (in a beaker and magnetic stir bar) with fresh deionized water and filtered in the Nutche filter. This repeated washing/filtration is repeated until the wash filtrate is pH 7 and conductivity less than 100 µS/cm. The pigment undergoes a final acetonitrile re-slurry wash and filtration to remove water. The isolated cake is dried in a vacuum tray dryer under vacuum at 50° C. until dry. The dried pigment is de-lumped in a coffee grinder, to yield ~35 g pigment.

A dispersion of the pigment made in Example 1 above dispersed in the following manner. To a 30 mL bottle were added 70.0 g of ⅛ inch diameter 440 C Grade 25 steel balls (available from Hoover Precision Products, Inc.) and then a solution of 0.297 g OLOA 11000 (available from Chevron Oronite Company LLC) in 6.28 g Isopar V (available from Alfa Chemicals Ltd.). To this were added 0.132 g of the pigment, from Example 1 above, at which point the bottle was placed on a jar mill with the speed adjusted such that the bottle was rotating at about 7 cm/s for 4 days. After the dispersion had been ball-milled for 4 days, 1 g of the resultant dispersion was transferred to a 1 dram vial and allowed to remain in an oven at 120° C. where the dispersion's viscosity and thermal stability were qualitatively assessed. The low-to-medium viscosity dispersion showed excellent stability at 120° C. where no settling of pigment particles from the vehicle was observed over 9 days (and only slight settling was observed after being held for 3 weeks at 120° C.) indicating excellent thermal stability characteristics about the dispersion.

COMPARATIVE EXAMPLE 1

In a 2 L jacketed reactor vessel fitted with a mechanical agitator (Heidolph mixer), condenser, and temperature probe, 750 g of concentrated (96-98%) sulfuric acid. The agitator is started and set to 300 rpm. 50 g of PR122 (from Dainichiseika) is added to the stirred acid mixture over a period of 30 minutes. A nitrogen atmosphere is introduced into the reactor and the mixture is heated to 50° C. in 30 minutes, using a circulatory bath attached to the reactor jacket, and kept at 50° C. for 3 hours to fully dissolve the pigment.

In a 6 L jacketed reactor vessel fitted with a mechanical agitator (IKA mixer) with a P4 stirrer blade, condenser with nitrogen fitting and temperature probe is charged 200 g de-ionized water. The reactor agitator is started and adjusted to 420 rpm. Cooling is applied to the 6 L reactor with a circulatory bath to bring the de-ionized water temperature to 5° C. After the 3 hour pigment dissolution time in the 2 L reactor, the pigment solution is added to the chilled and stirred de-ionized water dropwise over a period of 90 minutes, to quench the acid and precipitate the pigment. The reaction mixture is maintain at 5-10° C. during the quenching step via cooling applied to the reactor jacket via the circulatory bath. The pigment is filtered and concentrated using a Crossflow filtration unit fitted with a 0.5 micron ceramic filter element. The concentrated pigment slurry undergoes repeated washing/concentration with fresh de-ionized water, using the Crossflow unit, until the filtrate pH is 1.5-2.0. The concentrated pigment slurry is then vacuum filtered in a Nutche type filter (fitted with a 0.5 µ Gortex filter media) to isolate a wet pigment cake. The wet pigment cake is then re-slurry washed (in a beaker and magnetic stir bar) with fresh de-ionized water and filtered in the Nutche filter. This repeated washing/filtration is repeated until the wash filtrate is pH 6 and conductivity less than 100 µS/cm. The isolated cake is dried in a vacuum tray dryer under vacuum at 50° C. until dry. The dried pigment is de-lumped in a coffee grinder, to yield 39 g pigment.

A dispersion of the pigment made above (comparative example 1) was dispersed in the following manner. To a 30 mL bottle were added 70.0 g of ⅛ inch diameter 440C Grade 25 steel balls (available from Hoover Precision Products, Inc.) and then a solution of 0.297 g OLOA 11000 (available from Chevron Oronite Company LLC) in 6.28 g Isopar V (available from Alfa Chemicals Ltd.). To this were added 0.132 g of the pigment, made as above, at which point the bottle was placed on a jar mill with the speed adjusted such that the bottle was rotating at about 7 cm/s for 4 days. After the dispersion had been ball-milled for 4 days, 1 g of the resultant dispersion was transferred to a 1 dram vial and allowed to remain in an oven at 120° C. where the dispersion's viscosity and thermal stability were qualitatively assessed. The low viscosity dispersion showed extreme settling of particles after only 1 day at 120° C. indicating extremely poor thermal stability characteristics about the dispersion.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A process for preparing coated nanoscale quinacridone pigment particles, comprising:
   providing a first solution comprising a surface additive compound in an acid;
   adding a quinacridone pigment precursor or crude quinacridone pigment into the first solution and causing said surface additive compound to coat formed nanoscale quinacridone pigment particles; and
   adding the first solution and coated nanoscale quinacridone pigment particles into a second solution comprising deionized water to form a third solution and to precipitate the coated nanoscale quinacridone pigment particles;
   wherein the surface additive compound comprises a rosin compound.

2. The process of claim 1, further comprising heating the quinacridone pigment precursor or crude quinacridone pigment, and surface additive compound, in said first solution.

3. The process of claim 1, further comprising neutralizing the third solution by adding a neutralizing agent.

4. The process of claim 3, wherein the neutralizing agent is selected from the group consisting of an ammonia solution, alkali metal hydroxides, and alkali metal carbonates.

5. The process of claim 1, wherein the coated nanoscale quinacridone pigment particles have any average particle diameter of less than about 150 nm as derived from Transmission Electron Microscopy.

6. The process of claim 1, wherein the nanoscale quinacridone pigment particles are formed from a quinacridone precursor selected from the group consisting of 2,5-dianilino terephthalic acid derivatives, compounds of Formula 1 and esters and amides thereof that possess linear, branched or cyclic alkyl groups having from 1 to about 20 carbon atoms

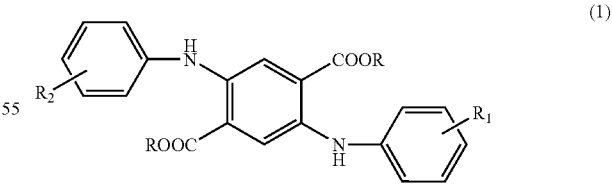

(1)

wherein R represents hydrogen, a linear, branched or cyclic alkyl group having from 1 to about 20 carbon atoms, or substituted or unsubstituted aryl groups; $R_1$ and $R_2$ each independently represents H, alkyl, alkoxyl, and aryloxyl groups, and halogen atoms.

7. The process of claim 1, wherein the nanoscale quinacridone pigment particles are formed from a quinacridone precursor selected from the group consisting of compounds of the following Formula (1):

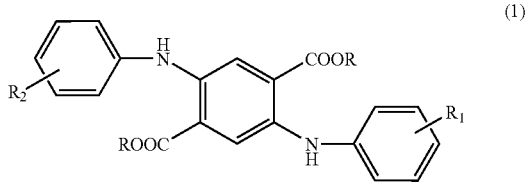

wherein R represents hydrogen, a linear, branched or cyclic alkyl group having from 1 to about 20 carbon atoms or substituted or unsubstituted aryl groups; $R_1$ and $R_2$ each independently represents H, alkyl, alkoxyl, and aryloxyl groups, and halogen atoms.

8. The process of claim 7, wherein the nanoscale quinacridone pigment particles are formed from a quinacridone precursor selected from the group consisting of:
  a) compound of the formula (1) wherein $R_1=R_2=H$;
  b) compound of the formula (1) wherein $R_1=H$, $R_2=$halide;
  c) compound of the formula (1) wherein $R_1=R_2=CH_3$, $CH_2CH_3$, $CH_2CH_2CH_3$, $CH(CH_3)_2$;
  d) compound of the formula (1) wherein $R_1=H$, $R_2=CH_3$, $CH_2CH_3$, $CH_2CH_2CH_3$, $CH(CH_3)_2$;
  e) compound of the formula (1) wherein $R_1=CH_3$, $CH_2CH_3$, $CH_2CH_2CH_3$, $CH(CH_3)_2$; $R_2=$halide;
  f) compound of the formula (1) wherein $R_1=R_2=$halide;
  g) compound of the formula (1) wherein $R_1=Cl$, $R_2=Br$;
  h) compound of the formula (1) wherein $R_1=R_2=OCH_3$, $O-CH_2CH_3$, $O-CH_2CH_2CH_3$, $O-CH(CH_3)_2$, $O-(CH_2)C_6H_5$;
  i) compound of the formula (1) wherein $R_1=H$, $R_2=OCH_3$, $O-CH_2CH_3$, $O-CH_2CH_2CH_3$, $O-CH(CH_3)_2$, $O-(CH_2)C_6H_5$ and
  j) compound of the formula (1) wherein $R_1=OCH_3$, $O-CH_2CH_3$, $O-CH_2CH_3$, $O-CH_2CH_2CH_3$, $O-CH(CH_3)_2$, $O-(CH_2)C_6H_5$, $R_2=$halide.

9. The process of claim 1, wherein the rosin compound is selected from the group consisting of hydrogenated and non-hydrogenated forms of rosins, rosin esters, rosin acids, rosin salts, and mixtures thereof.

10. The process of claim 1, wherein the rosin compound is selected from the group consisting of hydrogenated rosin glycerin ester, levopimaric acid, neoabietic acid, palustric acid, abietic acid, dehydroabietic acid, seco-dehydroabietic acid, tetrahydroabietic acid, dihydroabietic acid, pimaric acid, and isopimaric acid, calcium resonates, zinc resonates, magnesium resonates, barium resonates, lead resonates, cobalt resonates, mixed resonates, sodium salts of rosins, alkyl esters of rosin or hydrogenated rosin, and mixtures thereof.

11. The process of claim 1, wherein the surface additive compound forms a continuous or substantially continuous coating on said nanoscale quinacridone pigment particles.

12. The process of claim 1, wherein the surface additive compound improves dispersibility and stability of the nanoscale quinacridone pigment particles in an ink vehicle.

13. The process of claim 1, comprising adding crude quinacridone pigment to said first solution.

14. The process of claim 1, wherein the acid is selected from the group consisting of strong mineral acids and strong organic acids.

15. The process of claim 14, wherein the acid is selected from the group consisting of sulfuric acid, nitric acid, perchloric acid, hydrohalic acids, fluorosulfonic acid, chlorosulfonic acid, phosphoric acid and polyphosphoric acid, boric acid, organo-sulfonic acid, arenesulfonic acids, acetic acid, haloacetic, dihaloacetic, trihaloacetic acids, cyanoacetic acid, and mixtures thereof.

16. The process of claim 1, further comprising adding a precipitating agent to at least one of the second and third solutions.

17. The process of claim 1, wherein the precipitating is conducted at a temperature of from abot 0 to about 90° C.

18. The process of claim 1, comprising adding quinacridone pigment precursor to said first solution.

19. The process of claim 18, wherein the adding quinacridone pigment precursor to said first solution further comprises a chemical transformation to form quinacridone pigment molecules from said quinacridone pigment precursor.

20. The process of claim 1, wherein a concentration of the coated nanoscale quinacridone pigment particles present in the third solution is from about 0.5% to about 20% by weight.

* * * * *